Sept. 10, 1929.     A. M. JOHNSON     1,727,984
SPINDLE SLEEVE FOR DRILLING MACHINES
Filed Aug. 1, 1927
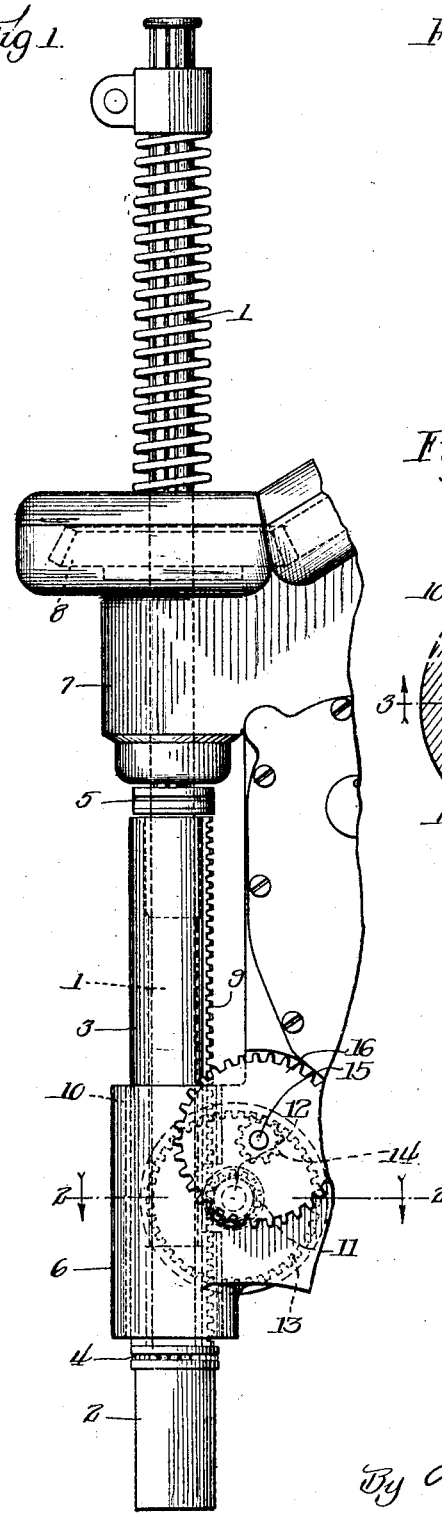
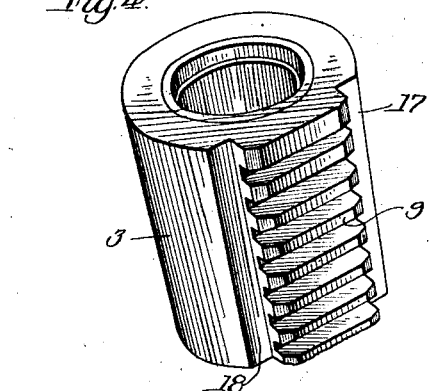
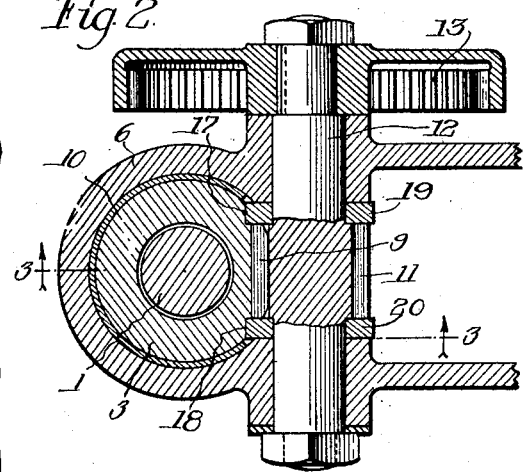
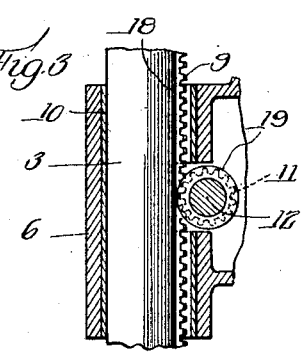
Inventor
Albert M. Johnson,
By Churchill Parker Carlson
attys Patented Sept. 10, 1929.

1,727,984

UNITED STATES PATENT OFFICE.

ALBERT M. JOHNSON, OF ROCKFORD, ILLINOIS, ASSIGNOR TO BARNES DRILL COMPANY, OF ROCKFORD, ILLINOIS, A CORPORATION OF ILLINOIS.

SPINDLE SLEEVE FOR DRILLING MACHINES.

Application filed August 1, 1927. Serial No. 210,002.

The invention relates to the tool operating mechanism in drilling machines and more particularly to an improved construction of reciprocating sleeve for supporting the tool carrying spindle.

In machines of this type a spindle is supported for rotative movement causing the cutting action of the tool, and it is also supported for longitudinal movement causing the tool to enter the work being operated upon. The latter movement is usually accomplished by providing a sleeve about a portion of the spindle, within which the spindle may rotate and which controls the longitudinal position of the spindle. Such sleeves usually carry a toothed rack bar attached thereto, which is engaged with suitable mechanism for imparting the desired longitudinal movement to the sleeve and the spindle.

Such rack bars have extended laterally of the cylindrical periphery of the sleeve and thereby have prevented the use of bushings in the bearings for the sleeve. Also the strain upon the means of attachment of the rack bar often times causes play between it and the sleeve with loss of accuracy in the control of the spindle. Furthermore the positioning of the rack teeth at a substantial distance from the axis of the spindle causes lateral torque in the sleeve about the point of intersection of its axis with a perpendicular through the axis of the rack pinion, resulting in uneven wear of the sleeve bearings and the loss of accurate positioning of the spindle.

It is the principal object of this invention to provide a sleeve structure having integral rack teeth which are positioned wholly within the cylindrical cross-sectional area of the sleeve, thus permitting the use of full bushings in the bearings for the sleeve, in combination with means of an advantageous character for guiding the sleeve in its longitudinal movement so as to prevent rotation of the sleeve in the supporting structure.

Other objects and advantages will be apparent in the following detailed description of a preferred embodiment of the invention which I have selected for illustration in the accompanying drawings. It will be understood however, that various changes in form, construction, and arrangement may be made by those skilled in the art without departing from the scope and spirit of the invention as expressed in the appended claims.

Referring to the drawings, Figure 1 is a fractional elevation of a portion of the head of a drilling machine of the type described, and illustrating the tool carrying spindle with its associated supporting structure and operating mechanisms.

Fig. 2 is a cross-sectional view taken on the plane of the line 2—2 in Fig. 1.

Fig. 3 is a fractional sectional elevation taken on the planes of the broken line 3—3 in Fig. 2.

Fig. 4 is a perspective view of an end portion of the spindle supporting sleeve.

The reference numeral 1 indicates a spindle, carrying at its lower end a conventional tool holding socket 2 and supported in its lower portion within a substantially cylindrical sleeve 3, the spindle extending outwardly of the ends of the sleeve. A thrust bearing 4 is preferably positioned between the lower end of the sleeve and the tool socket, the sleeve being retained in fixed longitudinal relation to the spindle by means of a second thrust bearing 5 positioned on the spindle at the upper end of the sleeve.

The sleeve 3 is supported for longitudinally slidable movement within a bearing structure 6 forming part of the head casing of the machine. The upper portion of the spindle is supported for rotative and longitudinal movement in suitable bearings carried in an extension 7 of the upper portion of the head casing, the spindle having a driving gear 8 splined on its upper portion and having suitable rotative bearing in the extension 7.

The sleeve 3 is provided on one side with a longitudinally extending rack bar comprising the teeth 9 formed integral with the sleeve structure, the contour of the rack teeth lying wholly within the circular cross sectional area of the sleeve. The sleeve and rack teeth being so formed are enabled to operate within a cylindrical bearing and permit the use of the cylindrical bearing bushing indicated at 10 positioned within the sleeve bearing structure 6.

Longitudinal movement of the sleeve and spindle is accomplished by means of a pinion 11 in constant engagement with the rack teeth 9 and extending through a limited opening in the side wall of the bearing structure 6 and the bushing 10. The pinion 11 is mounted on a shaft 12 having suitable bearings in the structure 6, and being provided with an internal gear 13 actuated by a pinion 14 carried on a shaft 15 driven by a gear 16, the latter being one of a train of gears (not shown) brought down from a suitable power take off in the spindle driving mechanism.

The sleeves 3 is further provided with longitudinal channels 17 and 18 positioned at each side of the rack teeth 9 and formed in the structure of the sleeve. The channels 17 and 18 provide guide ways with which are engaged respectively a pair of annular rollers or bearing rings 19 and 20 positioned on the shaft 12 immediately adjacent each side of the pinion 11. The rings 19 and 20 are retained in relative position by outward lateral abutment with the adjacent faces of the respective shaft bearings. With the rotation of the pinion 11, the rings 19 and 20 roll in the ways 17 and 18 and securely hold the sleeve 3 against rotative movement, with a minimum of friction between the sleeve and the rings.

It will be observed that the rack teeth 9 are positioned relatively close to the center axis of the sleeve, and that the force of the actuating pinion is applied near to the axial center with a minimum of lateral torque in the sleeve bearings. Also, the rack teeth, being cut in the sleeve structure, have all of the rigidity of integral construction. Further, the possibility of using a cylindrical bushing in the sleeve bearing, having only a lateral opening to admit the rack engaging pinion, enables utilizing the advantages of such a bearing bushing to support the reciprocating sleeve.

I claim as my invention:

1. A spindle supporting structure for drilling machines and the like comprising, in combination, a bearing support, a cylindrical bearing member within said support having a restricted opening at one side thereof, a sleeve mounted in said bearing for longitudinal movement, a rack mounted on the outer periphery of said sleeve and confined within the cylindrical contour of the sleeve, an angular bearing channel formed in said sleeve adjacent and parallel to the rack, a gear operatively mounted in said bearing support and having operative engagement with said rack through said opening, a roller mounted at one side of said gear and projecting into said channel so as to hold the sleeve against rotation in the support, and a spindle rotatable in said sleeve.

2. A spindle supporting structure having a bearing support, a cylindrical bearing therein having a restricted opening at one side thereof, a sleeve positioned in said bearing for longitudinal movement therein, a rack bar mounted on the outer periphery of said sleeve confined within the cylindrical contour of said sleeve, a bearing channel formed in said sleeve at each side of and parallel to said rack bar, a gear operatively mounted in said bearing support and having operative engagement with said rack bar through said opening, a ring mounted on each side of said gear in coaxial relation thereto and having operative contact with said bearing channels respectively, and a spindle rotatable in said sleeve.

3. In a spindle supporting structure, a reciprocatory cylindrical sleeve having a longitudinal series of rack teeth formed therein and disposed wholly within the cylindrical contour of the sleeve, a longitudinal guiding channel formed in said sleeve on each side of said teeth, a gear having operative engagement with said rack teeth, and a pair of annular guiding members coaxially mounted with said gear and extending into bearing relation with said guiding channels respectively so as to hold said sleeve against rotation in said supporting structure.

4. In a machine of the character described, the combination of a supporting structure, a cylindrical sleeve mounted for reciprocation in said structure and having a longitudinal series of rack teeth formed therein wholly within the cylindrical contour of the sleeve, a spur pinion mounted in said supporting structure and meshing with said rack teeth of the sleeve, said sleeve having a longitudinal guide channel formed adjacent to and at one side of said rack teeth, and a roller mounted on the axis of said pinion and projecting into said channel so as to hold the sleeve against rotation in said supporting structure.

In testimony whereof, I have hereunto affixed my signature.

ALBERT M. JOHNSON.